US011365837B2

(12) United States Patent
Drivon

(10) Patent No.: US 11,365,837 B2
(45) Date of Patent: Jun. 21, 2022

(54) CLAMPING COLLAR WITH FOLDABLE RETAINING FINGER TABS

(71) Applicant: CAILLAU, Issy-les-Moulineaux (FR)

(72) Inventor: Stéphane Drivon, Romorantin (FR)

( * ) Notice: Subject to any disclaimer, the term of this patent is extended or adjusted under 35 U.S.C. 154(b) by 227 days.

(21) Appl. No.: 16/675,297

(22) Filed: Nov. 6, 2019

(65) Prior Publication Data

US 2020/0141525 A1 May 7, 2020

(30) Foreign Application Priority Data

Nov. 7, 2018 (FR) ........................................ 1871397

(51) Int. Cl.
*F16L 23/08* (2006.01)
*F16L 23/00* (2006.01)
*F16L 23/20* (2006.01)

(52) U.S. Cl.
CPC ............. *F16L 23/08* (2013.01); *F16L 23/003* (2013.01); *F16L 23/20* (2013.01)

(58) Field of Classification Search
CPC ......... F16L 23/003; F16L 23/04; F16L 23/08; F16L 23/16; F16L 23/162; F16L 23/18; F16L 23/20; F16L 21/06; F16L 21/065
USPC ........ 285/420, 410, 407, 408, 365, 366, 367
See application file for complete search history.

(56) References Cited

U.S. PATENT DOCUMENTS

| 7,399,005 B2 | 7/2008 | Caillau |
| 9,016,731 B2 | 4/2015 | Caillau |
| 2013/0207389 A1* | 8/2013 | Rigollet ................ F16L 23/003 |
| | | 285/407 |
| 2017/0284578 A1 | 10/2017 | Caillau |

FOREIGN PATENT DOCUMENTS

| EP | 1451498 A1 | 9/2004 |
| EP | 2598785 A1 | 6/2013 |
| EP | 3189261 A1 | 7/2017 |
| FR | 3057918 A1 | 4/2018 |

OTHER PUBLICATIONS

English language abstract of FR 3057918.

\* cited by examiner

*Primary Examiner* — Aaron M Dunwoody
(74) *Attorney, Agent, or Firm* — Robert Facey; Adam Lewental

(57) ABSTRACT

A clamping system for connecting a first tube and a second tube whose facing ends have projecting clamping surfaces includes a collar having a belt able to be clamped around the clamping surfaces and a washer supported by the collar. The belt includes a first and a second sidewall between which is delimited an internal recess able to receive the clamping surfaces. The washer carries at least one foldable retaining finger which has a free end portion projecting axially beyond a first edge of the belt over a distance sufficient to allow manual manipulation thereof, the free end portion having a retaining edge configured, when the end portion is folded towards the axis of the belt, to be retained outside the belt by a radially projecting element.

18 Claims, 3 Drawing Sheets

[Fig.1]
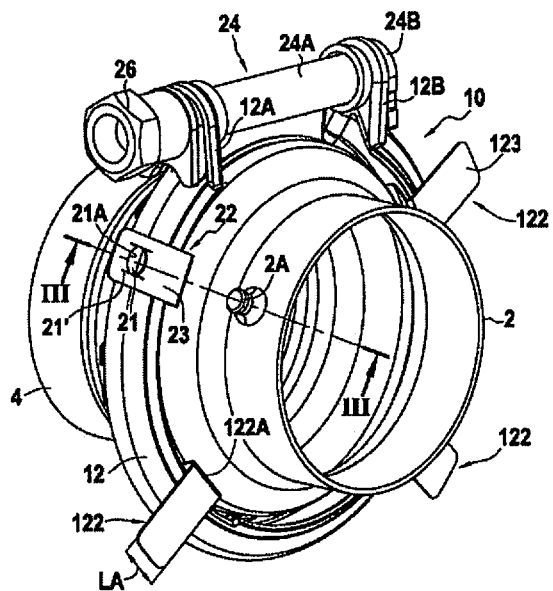
[Fig.3]
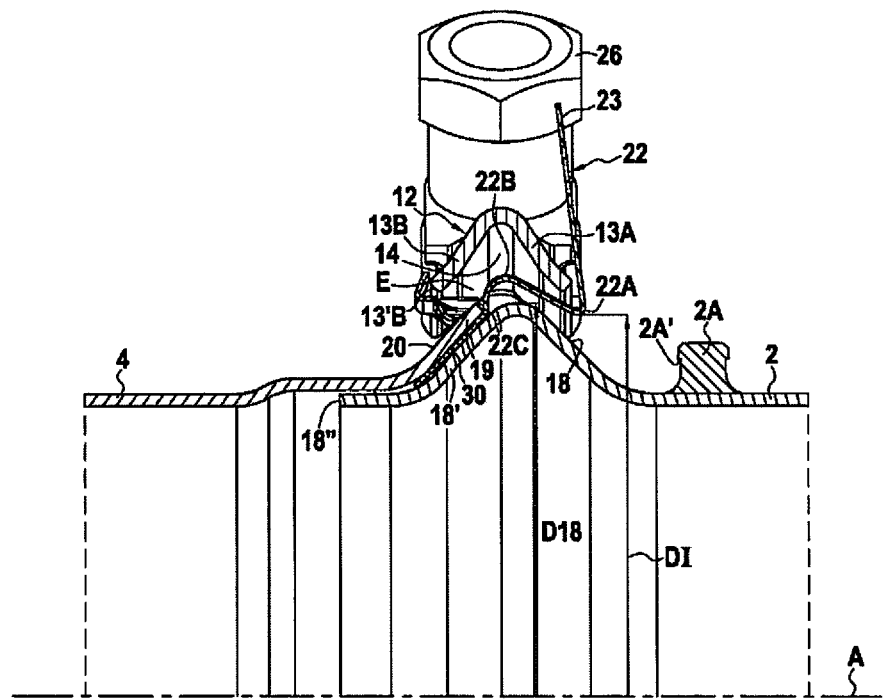

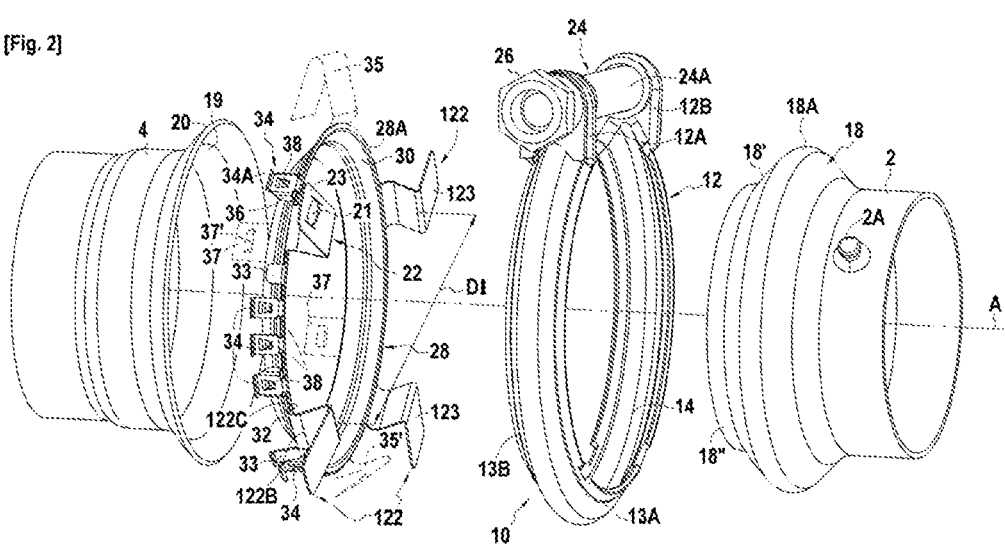

[Fig.4]
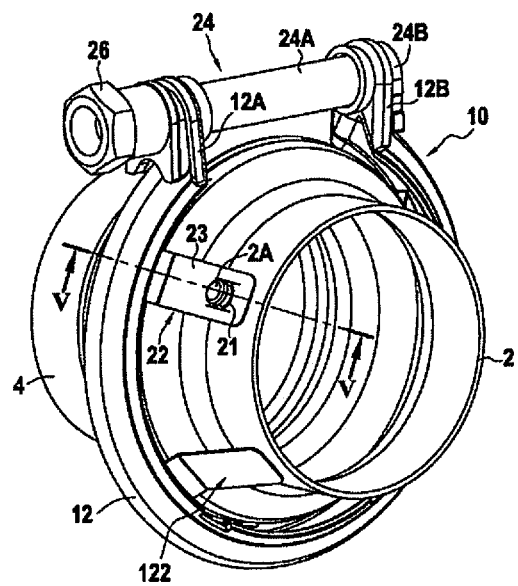
[Fig.5]
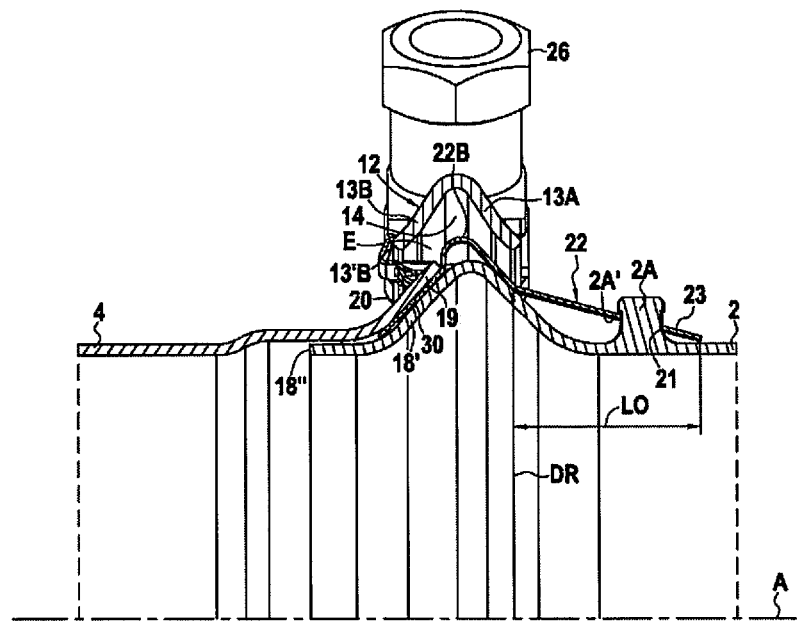

CLAMPING COLLAR WITH FOLDABLE RETAINING FINGER TABS

BACKGROUND OF THE INVENTION

The present disclosure relates to a clamping system for connecting a first tube and a second tube whose facing ends have clamping surfaces projecting relative to the cylindrical outer surface of said tubes.

A clamping system of this type is known, for example from the European patents EP 1 451 498 and EP 2 598 785.

In such a system, the collar comprises a belt able to be clamped around the clamping surfaces of the tubes. The belt has sidewalls between which an internal recess is delimited in which the clamping surfaces of the tubes are disposed to achieve the clamping. The tubes are thus held clamped relative to each other. As indicated in the aforementioned patents, it may be useful to pre-mount the clamping system on the end of at least one of the tubes before making the clamping.

In order to allow a pre-mounting on the two tubes, document EP 2 598 785 recommends that the clamping system comprises a washer supported by the collar by being retained relative to the collar by fastening tabs, the washer comprising first and second pre-mounting tabs able to respectively cooperate with the first and the second tubes to retain the washer, and therefore the entire clamping system, relative to the respective clamping surfaces of the tubes prior to the clamping. These pre-mounting tabs comprise in this case short tabs extending back above the frustoconical annular shape of the washer to cooperate with the clamping surface of the tube whose clamping surface is disposed between the belt and the washer. These pre-mounting tabs also include long tabs, which extend from the top of the washer in the direction opposite to the washer in order to cooperate with the clamping surface of the other tube.

In document EP 2 598 785, the tabs of these two categories are elastically deformable. This device generally gives satisfaction, but, for some applications, it is important to enhance reliability of the retention of the tabs relative to the clamping surfaces, particularly with regard to the long tabs. Indeed, particularly regarding long tabs, it may be difficult to ensure the right range of elastic deformation for some clamping diameters, particularly large diameters in the order of 5 cm or more. On the one hand, it is necessary to make sure that the modulus of elasticity of these tabs is sufficiently high so that they have the desirable elasticity to, after having been deformed during the engagement of the tube into the clamping system, elastically resume a position ensuring the pre-mounted retention of this tube. They must then have the elastic responsiveness necessary to not deform too easily if a traction is exerted on the tube in the direction of its disengagement from the clamping system. However, this elastic retention is useful only in the pre-mounted state, prior to the clamping. In the clamped state, it is on the contrary desirable for the tabs to be deformed so as to be pressed inside the belt of the collar, without compromising the quality of the clamping. However, if the elastic modulus of the tabs is high, the latter property can be difficult to achieve in some cases, particularly for the large diameter collars. In addition, if the elastic modulus is too high, the engagement thrust force necessary for the snap-fitting of the tabs on the clamping surface of the tube can be high, and difficult to achieve in a context of final mounting.

Thus, even if the system of document EP 2 598 785 is satisfactory for a large number of applications, it is desirable to propose another solution allowing a pre-mounting of the clamping system at the end of the first tube substantially free of the aforementioned drawbacks, particularly for the large diameter collars.

Document EP 1 451 498 proposes a system allowing a pre-mounting relative to a tube, by means of pre-mounting tabs also carried by the belt via a washer itself carried by the belt. The same problems as those mentioned above can arise for a pre-mounting relative to a single tube.

In addition, other clamping systems are known comprising a collar and a washer carried by the collar, the washer having inner tabs, able to grip inside one of the tubes, to pre-mount the clamping system at the end of this tube. It may be useful to complete this system to also allow a pre-mounting relative to the other tube. The long tabs proposed by document EP 2 598 785 can be used for this purpose, but, particularly for collars of large diameters, there is a need for another solution, substantially free of the aforementioned drawbacks.

OBJECT AND SUMMARY OF THE INVENTION

In general, there is a need for a clamping system that allows a controlled retention in the pre-mounted state relative to the clamping surface of one of the tubes it is intended to clamp.

This object is achieved by a clamping system for connecting a first tube and a second tube whose facing ends have clamping surfaces projecting relative to the cylindrical outer surface of said tubes, the system comprising a collar that comprises a belt able to be clamped around said clamping surfaces and a washer supported by the collar, the belt having a first and a second sidewall between which is delimited an internal recess able to receive the clamping surfaces, the washer carrying at least one foldable retaining finger which has a free end portion projecting axially beyond a first edge of the belt over a distance sufficient to allow manual manipulation thereof, said free end portion having a retaining edge configured, when said end portion is folded towards the axis of the belt, to be retained outside the belt by a radially projecting element.

Thus, since the radially projecting element is a retaining projection forming part of the first tube or carried thereby, the clamping system can be easily positively retained relative to the first tube by folding the retaining finger so as to make the retaining edge cooperate with this retaining projection.

Optionally, the free end portion of the foldable retaining finger has an opening whose edge forms the retaining edge.

Optionally, the foldable retaining finger has at least a first corrugation, whose convexity is turned towards the axis of the belt, the retaining edge being located beyond said first corrugation, towards the free end of the foldable retaining finger away from the belt.

Optionally, the foldable retaining finger further has at least a second corrugation, which is located between the first corrugation and the inner end of the foldable retaining finger which is opposite to its free end, and whose concavity is turned towards the axis of the belt.

Optionally, the foldable retaining finger is formed in one piece with the washer.

Optionally, an annular space is arranged between the second sidewall and the washer, and the foldable retaining finger extends from the washer towards the first sidewall and beyond this first sidewall.

For example, the washer has fastening tabs cooperating with the collar to retain the washer relative to the belt by arranging this annular space between the second sidewall and the washer. It is for example fastening tabs cooperating with the belt and, particularly, with its second sidewall. In this case, the fingers on the one hand and the fastening tabs on the other hand, can extend on either side of the washer. According to another example, in the case where the collar comprises a clamping screw, the fastening tabs may comprise a loop-shaped retaining tab which radially projects from the washer and in which is/are engaged the screw, as well as, possibly one or more other tabs connecting the washer to the belt by being for example hooked or pinched on a portion of the belt.

Optionally, the washer has elastically deformable pre-mounting tabs able, in the unclamped state of the belt, to retain the collar relative to the second tube when the clamping surfaces of said second tube is engaged into the internal recess.

Optionally, the washer carries at least one additional finger having a retaining portion able to cooperate with the clamping surface of one of the tubes in an unclamped state of the collar.

Optionally, the additional finger is able, from an initial position in which its retaining portion is at a rest distance from the axis of the belt, to be plastically folded manually towards the axis of the belt so as to bring its retaining portion closer to the axis of the belt.

Optionally, the additional finger has at least a first corrugation whose convexity is turned towards the axis of the belt, the retaining portion being formed on said first corrugation.

The present disclosure also relates to an assembly comprising a clamping system of the aforementioned type according to the present disclosure and a first tube having in the vicinity of its free end, a clamping surface projecting relative to its cylindrical outer surface, the first tube further having a retaining projection located on the other side of its clamping surface relative to its free end, the retaining edge cooperating with said retaining projection when the end portion of the foldable retaining finger is folded towards the axis of the belt.

The present disclosure further relates to a method for mounting an assembly according to the present disclosure, wherein the free end of the first tube is engaged into the internal recess from the first edge of the belt while the foldable retaining finger is in an unfolded initial position, until the retaining projection of the first tube becomes within the reach of the retaining edge of the foldable retaining finger, then said finger is folded to make said retaining edge cooperate with said retaining projection.

Optionally, when an annular space is arranged between the second sidewall and the washer, and the foldable retaining finger extends from the washer towards the first sidewall and beyond this first sidewall, the free end of a second tube is first engaged into the internal recess from the second edge of the belt until said free end reaches the annular space arranged between the second sidewall and the belt.

The clamping system thus defined according to the present disclosure, may initially be disposed around the end of the first tube by engagement of the clamping surface of this first tube into this system, while the retaining finger is in its unfolded initial position.

Once the end of the first tube thus engaged into the clamping system, the operator can manually deform the retaining finger to fold it towards the axis of the belt, so as to make the retaining edge cooperate with the element radially projecting on the first tube.

The present disclosure will be well understood and its advantages will become more apparent upon reading the following detailed description of one embodiment presented by way of example in the appended drawings.

SHORT DESCRIPTION OF THE DRAWINGS

FIG. 1 is a perspective view showing a clamping system according to the present disclosure, mounted on tubes, before the clamping of this system and while the foldable retaining finger is in its unfolded initial position.

FIG. 2 is an exploded perspective view showing the clamping system comprising a clamping collar and a clamping washer separated from each other and also showing the ends of the first and second tubes.

FIG. 3 is a sectional view in the radial plane III-III of FIG. 1.

FIG. 4 is a view similar to FIG. 1, while the foldable retaining finger is folded.

FIG. 5 is a sectional view in the radial plane V-V of FIG. 4.

DETAILED DESCRIPTION OF THE INVENTION

FIGS. 1 to 3 are firstly described. It can be seen from these figures that the clamping system comprises a collar 10, of the same type as the one described in document EP 2 598 785 and a washer 28, which cooperate to assemble two tubes 2, 4.

In the following, the term "inner" will refer to the elements that are directed towards the axis A of the two tubes placed end-to-end and that are the closest to this axis A with respect to other elements referred to as "outer", the "outer" elements being also those that are directed opposite to the axis A. It is also considered that the axis A of the two tubes is also the axis of the belt of the collar, the latter being wound on itself.

The collar comprises a belt 12 which delimits a recess 14 in which the clamping surfaces, respectively 18 belonging to the first tube 2 and 20 belonging to the second tube 4 can be inserted. This recess and these clamping surfaces have shapes such that the clamping of the belt of the collar forces the ends of the tubes 2 and 4 to move closer to each other. The recess 14 is delimited between a first and a second sidewall 13A and 13B of the belt 12, these sidewalls defining in this case the branches of a V seen in axial section. Thus, the belt 12 has an advantageously V-shaped axial section, while the clamping surfaces 18 and 20 have a diameter that gradually increases towards the free ends facing the tubes and are for example of frustoconical shape.

The belt 12 has ends respectively 12A and 12B, which are substantially radially straightened so as to form bearing tabs. These tabs are pierced so as to allow the passage of the rod 24A of a clamping screw 24 through these tabs. The head 24B of the screw is wedged relative to one of the bearing tabs, in this case the tab 12B, while a nut 26 is retained relative to the other bearing tab 12A. It is understood that the rotation of the nut in the screwing direction brings the bearing tabs closer to each other and therefore reduces the internal diameter of the collar, that is to say it allows clamping the strip. Of course, other ways of clamping the strip can be considered, for example hooking systems, as described in particular in the patent application FR 3 008 160.

The collar carries a series of foldable retaining fingers which, as better seen in FIG. 2, are evenly distributed. In this case, these foldable retaining fingers comprise a finger 22 which has a retaining opening 21, and fingers 122 devoid of such openings.

FIGS. 1 to 3 show these fingers 22 and 122 in their unfolded initial positions, in which they delimit a minimum rest diameter DI. It can be seen that this diameter DI is greater than the maximum diameter D18 (half of which is indicated in FIG. 1) of the clamping surface 18 of the first tube 2. In other words, the minimum rest diameter DI defined by the foldable fingers 22 and 122 is greater than the maximum diameter D18 of the clamping surface of the first tube 2. By convention, the minimum diameter defined by the foldable fingers is the smallest diametrical dimension they define in their areas other than the attachment to the washer 28 that will be described later. It is the smallest diametrical dimension of the passage that these fingers define for an element with a cylindrical surface (the first tube) engaging between these fingers.

The clamping system comprises a washer 28 which is supported by the collar 10. The foldable fingers 22 and 122 are carried by this washer 28. In this case, they are secured to the washer 28 by being formed in one piece with this washer.

The washer 28 has a frustoconical portion 30 which, as seen in FIG. 1, can be inserted between the ends facing the two tubes 2 and 4 when engaged into the clamping system. Indeed, the washer 28 is retained relative to the belt 12, in this case relative to its second sidewall 13B, by fastening tabs (described below) so that an annular space E is arranged between the second sidewall and the washer. The free end of the second tube 4 carrying its clamping surface 20 fits into this annular space E inside the recess 14 of the belt, while the free end of the first tube 2 carrying its clamping surface 18 fits on the opposite side of the annular space E relative to the washer, that is to say against the inner face of the frustoconical portion 30 of the washer 28.

In this case, the end of the tube 4 is a female flaring, its inner periphery forming a flaring 19. In contrast, the free end of the first tube 2 is a male end which, beyond the clamping surface 18, has an outer periphery 18' whose diameter decreases towards the termination of the free end 18". The end portion thus formed can therefore be inserted, substantially in a form-fitting manner, inside the flaring 19 formed at the end of the tube 4. The frustoconical portion 30 of the washer 28 may present annular deformations 32 (see FIG. 2) forming a seal between the inner surface of the flaring 19 and the outer periphery 18'.

The fastening of the washer 28 of the collar 10 and/or the pre-mounting of the clamping system comprising the collar and the washer on the tube 4 can be ensured in the same manner as in documents EP 2 598 785 and EP 1 451 498, by fastening tabs and/or pre-mounting tabs with which the washer is equipped. Thus, in the example represented, the washer 28 has a series of inner tabs 33. When the washer is assembled to the collar, these tabs cooperate with the inner periphery of the sidewall 13B of the belt and maintain the frustoconical portion 30 of the washer at a distance from this sidewall by arranging the space E above. The fastening tabs also comprise outer tabs 34, that are longer than the tabs 33 to protrude beyond the free inner edge 13'B of the sidewall 13B. In this case, the free ends of these outer tabs 34 are bent to form a hook 34A which comes closer to the outer face of the sidewall 13B.

In this case, these outer tabs 34 also allow the pre-mounting of the clamping system on the tube 4. Indeed, it is seen that lugs 38 are cut in these outer tabs so as to have their free ends directed on the side of the area of attachment of the outer tabs to the washer, by being oriented radially inwards so as to be hooked on the clamping surface 20 of the tube 4. It could of course be provided that such lugs 38 or the like are made on tabs other than outer tabs bent in hooks.

In FIG. 2, it is still seen that the outer tabs have, on their longitudinal edges, wings 36 folded inwards. The fastening tabs 33 and 34 are of small dimensions and deform elastically to achieve the hooking of the washer 28 inside the belt 12 and the hooking of the clamping system comprising the collar and the washer on the clamping surface 20 of the tube 4. Thus, the clamping system can be pre-mounted at the end of the tube 4. The tabs 33 and 34 deform during the clamping to press against the inner periphery of the sidewall 13A of the belt 12 of the collar and thus not oppose the clamping.

Other modes of fastening the washer to the collar can be used. For example, as indicated in dashed lines in FIG. 2, the washer may have a retaining loop 35, in which the shaft of the screw 24 can be engaged, as well as one or more retaining tabs 35' can be retained on the edge of the belt, for example by hooking or by pinching. Similarly, other modes of pre-mounting the clamping system relative to the tube 4 can be used, for example, as indicated by dashed lines in FIG. 2, by equipping the washer with inner tabs 37, engaging into the tube 4 and provided with externally projecting stud lugs 37' capable of clinging on the inner surface of the tube 4.

For the mounting of the assembly comprising the two tubes and the clamping system, the free end of the tube 4 is first engaged into the annular space E so as to pre-mount the clamping system around this annular end, then the free end of the tube 2 is engaged into the clamping system until the position represented in FIGS. 1 and 3 is reached.

The foldable fingers 22 and 122 then being in their initial position, this engagement is possible without particular forces. However, in this situation, the clamping system is not maintained pre-mounted at the end of the tube 2 which can be disengaged at a simple traction. To achieve this pre-mounting, the foldable fingers must be folded towards the axis, as represented in FIGS. 4 and 5.

According to the present disclosure, the washer 28 carries at least one foldable finger 22 of the retaining edge type described now.

In this case, as indicated, this finger 22 has an opening 21 whose edge 21A forms the retaining edge. This opening is arranged in a free end portion 23 of the finger 22 which extends beyond the first sidewall 13A of the belt. For its part, the first tube 2 has a radially projecting element 2A on its outer periphery. This element 2A forms a retaining projection for the retaining edge 21A. The retaining projection is axially aligned with the retaining edge and disposed such that, once the finger 22 is folded as illustrated in FIGS. 4 and 5, the retaining edge 21A is retained against this retaining projection 2A so as to oppose a relative axial displacement of the tube 2 and of the clamping system in the direction of a detachment of this type out of this this system.

Note that the opening 21 can have a circular or substantially circular shape and be bordered by slots 21', for example disposed on either side of the opening by being oriented in the direction of the length of the finger. These slots give the retaining edge 21A a slight ability to deform by rising slightly.

The retaining projection 2A is disposed on the side of the clamping surface 18 of the tube 2 which is opposite to the free end 18" of this tube and is outside the clamping system when this clamping system is disposed around this clamping surface 18. This retaining projection may have the shape of a substantially cylindrical pad, as represented. This pad may have a head with a slight flange 2A' as represented, to promote the radial retention of the edge of the opening 21 of the tab 22, by preventing the tab from detaching from the pad by a radial displacement.

Although the radial projection may optionally be formed in one piece with the tube 2, it is rather formed by a separate part, fastened to the tube 2 by any suitable means, for example by welding.

The drawings show the clamping system according to the present disclosure with only one retaining edge foldable finger 22. It may however include several fingers of this type, for example two diametrically opposite fingers or more fingers that can optionally be evenly distributed angularly. Of course, in this case, it is envisaged that the first tube comprises as many retaining projections 2A that can be disposed in axial register with the retaining edges of the fingers 22 when the clamping system is disposed around the first tube 2.

In this case, the system represented comprises, in addition to the retaining edge foldable finger 22, additional foldable fingers 122.

In this case, the foldable fingers 22 and 122 are similar, except that the fingers 122 do not comprise edge-type retaining edges 21A to cooperate with a radial projection of the first tube 2 located at a distance from its clamping surface 18 and, therefore, outside the belt 12 when the clamping system is disposed around this clamping surface.

Thus, once the clamping system is disposed around the clamping surface 18, the fingers 22 and 122 can be manually folded, to reach the positions represented in FIGS. 4 and 5. In this situation, the retaining projection 2A of the tube is inserted into the opening 21 of the finger 22. The retaining edge 21A is therefore positively engaged mechanically with the retaining projection 2A to retain the clamping system relative to the tube 2.

In addition, the fingers 22 and 122 define therebetween, at the clamping surface 18, a minimum flap diameter DR (the half-diameter DR is indicated in FIG. 5) smaller than the initial minimum rest diameter DI, and smaller than the maximum diameter D18 defined by the clamping surface 18 of the tube 2. Consequently, it is produced between the fingers 22 and 122 on the one hand and the clamping surface 18 on the other hand, a cooperation which contributes to retaining the free end of the tube 2 is also retained inside the clamping system. The latter is therefore pre-mounted on the two tubes.

The fingers 22 and 122 have free operating ends, respectively 23 and 123, which protrude well beyond the edge 13'A of the belt (which is in this case the free edge of the sidewall 13A) on the side of which the tube is engaged. Particularly, the protrusion length LO of the fingers beyond this edge, measured parallel to the axis A, is generally of at least 2 mm or even at least 8 mm. This length is in general comprised between 5 and 20 mm, preferably between 8 and 15 mm. The protrusion length is thus sufficient so that the fingers can be operated manually by their free ends. In addition, the width LA of the fingers, at least in their areas that protrude beyond the first edge 13'A, may be of at least 5 mm, for example between 5 mm and 10 mm. Somehow, these protruding free ends serve as spatulas that provide contact surfaces sufficient to the fingers of the operator for him to be able to actuate them.

Furthermore, each finger 22 or 122 has a first corrugation 22A or 122A whose convexity is turned towards the axis A of the belt. The rest DI and flap DR minimum diameters mentioned above are measured as diametrical dimensions of a circle delimited by the vertices of the first corrugations of the different fingers 22 and 122 in the region of the edge 13'A. It is also seen that each finger 22 or 122 further has a second corrugation 22B or 122B which is located between the first corrugation 22A or 122A and the inner end 22C or 122C of the finger opposite its free end 23. This inner end constitutes the base of the finger by which it is attached to the frustoconical portion 30 of the washer 28. The second corrugations are of a direction opposite to the first corrugations, the concavity of the second corrugations being turned towards the axis A.

These corrugations are noted in an axial section of the fingers 22 and 122. Thus, viewed in axial section at rest, a finger 22 or 122 has substantially the shape of the letter N, whose inflections are rounded, and whose termination can be extended like a tail so as to form the free operating end 23 or 123.

In the region of these corrugations, the finger is work-hardened so that the curvature of these corrugations is only slightly modified during the plastic deformation of the finger. This deformation is essentially made by a rocker in the region of the base 22C or 122C of the finger. It is also noted that the finger may have at least one longitudinal rib, over all or part of its length.

It should be noted here that plastic deformations of the foldable fingers can be reversed by the operator, who can raise them if he has pre-mounted the tube 2 by mistake, which can enable him to extract this tube from the clamping system without significant effort. Particularly, he can bring out the retaining projection 2A from the opening 21 of the finger 22.

Apart from the possible work-hardening areas mentioned above, the fingers 22 and 122 have some flexibility and a modulus of elasticity lower than the tabs 33 and 34 previously described. The finger 22 remains folded against the tube 2.

The clamping belt and the washer are preferably made of metal. With regard particularly to the washer, the latter can be made in an austenitic-type stainless steel sheet being particularly of a thickness comprised between 0.1 mm and 0.5 mm, or even between 0.2 and 0.4 mm.

The invention claimed is:

1. A clamping system for connecting a first tube and a second tube, said first and second tubes including facing ends having clamping surfaces projecting relative to cylindrical outer surfaces of said first and second tubes, the clamping system comprising:
a collar comprising a belt capable of clamping around said clamping surfaces and a washer supported by the collar, the belt having an axis and comprising a first sidewall, a second sidewall and an internal recess capable of receiving the clamping surfaces which are delimited between said first and second sidewalls, the washer carrying at least one foldable retaining finger having a free end portion projecting axially beyond a first edge of the belt over a distance sufficient to allow manual manipulation thereof, said free end portion having a retaining edge configured, when said free end portion is folded towards the axis of the belt, to be retained outside the belt by a radially projecting element, wherein said free end portion of the foldable retaining finger has an opening having an edge which forms the retaining edge.

2. The clamping system according to claim 1, wherein the foldable retaining finger is formed in one piece with the washer.

3. The clamping system according to claim 1, wherein an annular space is arranged between the second sidewall and the washer, and the foldable retaining finger extends from the washer towards the first sidewall and beyond the first sidewall.

4. The clamping system according to claim 3, wherein the washer has elastically deformable pre-mounting tabs capable of, in an unclamped state of the belt, retaining the collar relative to the second tube when a clamping surface of said second tube is engaged with the internal recess.

5. The clamping system according to claim 1, wherein the washer carries at least one additional foldable retaining finger having a retaining portion capable of cooperating with the clamping surface of one of the first or second tubes in an unclamped state of the collar.

6. The clamping system according to claim 5, wherein the additional foldable retaining finger is capable of, from an initial position in which the retaining portion of the additional folding retaining finger is at a rest distance from the axis of the belt, plastically folding manually towards the axis of the belt so as to bring the retaining portion of the additional foldable retaining finger closer to the axis of the belt.

7. The clamping system according to claim 5, wherein the additional foldable retaining finger has at least a first corrugation having a convexity turned towards the axis of the belt and the retaining portion is formed on said first corrugation.

8. An assembly comprising:
a first tube having, in the vicinity of a free end thereof, a clamping surface projecting relative to a cylindrical outer surface and a retaining projection located on another side of the clamping surface relative to the free end; and
a clamping system comprising a collar having a belt capable of clamping around said clamping surface and a washer supported by the collar, the belt having an axis and comprising a first sidewall, a second sidewall and an internal recess capable of receiving the clamping surfaces which are delimited between said first and second sidewalls, the washer carrying at least one foldable retaining finger having a free end portion projecting axially beyond a first edge of the belt over a distance sufficient to allow manual manipulation thereof, said free end portion having a retaining edge configured, when said free end portion is folded towards the axis of the belt, to be retained outside the belt by said retaining projection.

9. The assembly according to claim 8, wherein the free end portion of the foldable retaining finger has an opening having an edge which forms the retaining edge.

10. The assembly according to claim 8, wherein the foldable retaining finger has at least a first corrugation having a convexity turned towards the axis of the belt and the retaining edge is located beyond said first corrugation, towards the free end portion of the foldable retaining finger and away from the belt.

11. The assembly according to claim 8, wherein an annular space is arranged between the second sidewall and the washer, and the foldable retaining finger extends from the washer towards the first sidewall and beyond the first sidewall.

12. The assembly according to claim 8, wherein the washer carries at least one additional foldable retaining finger having a retaining portion capable of cooperating with the clamping surface of the first tube in an unclamped state of the collar.

13. The assembly according to claim 12, wherein the additional foldable retaining finger is capable of, from an initial position in which the retaining portion of the additional folding retaining finger is at a rest distance from the axis of the belt, plastically folding manually towards the axis of the belt so as to bring the retaining portion of the additional folding retaining finger closer to the axis of the belt.

14. A method for mounting an assembly according to claim 8 comprising:
engaging the free end of the first tube with the internal recess of the first edge of the belt while the foldable retaining finger is in an unfolded initial position, until the retaining projection of the first tube is within reach of the retaining edge of the foldable retaining finger; and
folding said finger to make said retaining edge cooperate with said retaining projection.

15. The mounting method according to claim 14, further comprising the steps of arranging an annular space between the second sidewall and the washer, extending the foldable retaining finger from the washer towards the first sidewall and beyond this first sidewall, and engaging a free end of a second tube with the internal recess of the second edge of the belt until said free end of the second tube reaches the annular space arranged between the second sidewall and the belt.

16. A clamping system for connecting a first tube and a second tube, said first and second tubes including facing ends having clamping surfaces projecting relative to cylindrical outer surfaces of said first and second tubes, the clamping system comprising:
a collar comprising a belt capable of clamping around said clamping surfaces and a washer supported by the collar, the belt having an axis and comprising a first sidewall, a second sidewall and an internal recess capable of receiving the clamping surfaces which are delimited between said first and second sidewalls, the washer carrying at least one foldable retaining finger having a free end portion projecting axially beyond a first edge of the belt over a distance sufficient to allow manual manipulation thereof, said free end portion having a retaining edge configured, when said free end portion is folded towards the axis of the belt, to be retained outside the belt by a radially projecting element, wherein the foldable retaining finger has at least a first corrugation having a convexity turned towards the axis of the belt and the retaining edge is located beyond said first corrugation, towards the free end portion of the foldable retaining finger and away from the belt.

17. The clamping system according to claim 16, wherein the foldable retaining finger includes at least a second corrugation located between the first corrugation and an inner end of the foldable retaining finger which is opposite to the free end portion thereof, the second corrugation having a concavity turned towards the axis of the belt.

18. The clamping system according to claim 16, wherein the foldable retaining finger is formed in one piece with the washer.

* * * * *